United States Patent
Cochran et al.

(10) Patent No.: US 6,782,416 B2
(45) Date of Patent: Aug. 24, 2004

(54) DISTRIBUTED AND GEOGRAPHICALLY DISPERSED QUORUM RESOURCE DISKS

(75) Inventors: Robert A. Cochran, Rocklin, CA (US); Richard S. Wilkins, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 09/760,235

(22) Filed: Jan. 12, 2001

(65) Prior Publication Data

US 2002/0095470 A1 Jul. 18, 2002

(51) Int. Cl.[7] .............................................. G06F 15/16
(52) U.S. Cl. ...................... 709/208; 709/217; 711/161
(58) Field of Search ................................ 709/208, 211, 709/216, 217, 201, 248, 223; 707/203, 204, 202; 711/161, 162

(56) References Cited

U.S. PATENT DOCUMENTS 6,427,163 B1 * 7/2002 Arendt et al. ............... 709/201
6,438,705 B1 * 8/2002 Chao et al. ...................... 714/4
6,496,908 B1 * 12/2002 Kamvysselis et al. ....... 711/162
6,609,183 B2 * 8/2003 Ohran ......................... 711/161

* cited by examiner

Primary Examiner—Mehmet B. Geckil

(57) ABSTRACT

A server cluster quorum disk composed of two or more separate, intercommunicating disk drives or LUNs. The disk drives or LUNs that together compose a quorum disk may be physically separated by significant distances to form a geographically dispersed quorum disk, or may be more closely physically associated to form a distributed quorum disk. In either case, the two or more disk drives or LUNs closely cooperate to provide the virtual quorum disk interface identical to that of a single, currently available quorum disk with the exception that, upon failure of a disk LUN component of a distributed or geographically dispersed quorum disk, the distributed or geographically dispersed quorum disk continues to function without interrupting or degrading the server cluster in which the quorum disk is employed.

13 Claims, 16 Drawing Sheets

DISTRIBUTED AND GEOGRAPHICALLY DISPERSED QUORUM RESOURCE DISKS

TECHNICAL FIELD

The present invention relates to server clustering technologies employed to increase availability of network server computers and, in particular, to a method and system for increasing the reliability of a quorum-disk component used in clustered server systems.

BACKGROUND OF THE INVENTION

The present invention relates to server clustering technologies designed to provide server redundancy and server failover in order to increase the availability of data processing and data storage functionalities provided by the clustered servers to end users. The present invention may be implemented by enhancing various functionalities included in disk arrays. Therefore, a concise background of disk and disk-array technologies is provided below.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either read or WRITE requests. A READ request requests that the storage device return to the requesting remote computer some requested amount of electronic data stored within the storage device. A WRITE request requests that the storage device store electronic data furnished by the remote computer within the storage device. Thus, as a result of a read operation carried out by the storage device, data is returned via communications medium 102 to a remote computer, and as a result of a write operation, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coated with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105, which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations, in which data is stored onto, or retrieved from, the disk platters 104, is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The disk WRITE requests, in cache memory 207, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass storage devices other than hard disks, or combinations of memory, hard disks, and/or other types of mass storage devices. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass storage device, such as a disk array, a primary data object, such as a file or database, is normally backed up to backup copies of the primary data object on physically discrete mass storage devices or media so that if, during operation of the application or system, the primary data object becomes corrupted, inaccessible, or is overwritten or deleted, the primary data object can be restored by copying a backup copy of the primary data object from the mass storage device. Many different techniques and methodologies for maintaining backup copies have been developed. In one well-known technique, a primary data object is mirrored. FIG. 3 illustrates object-level mirroring. In FIG. 3, a primary data object "$O_3$" 301 is stored on LUN A 302. The mirror object, or backup copy, "$O_3$" 303 is stored on LUN B 304. The arrows in FIG. 3, such as arrow 305, indicate I/O write operations directed to various objects stored on a LUN. I/O write operations directed to object "$O_3$" are represented by arrow 306. When object-level mirroring is enabled, the disk array controller providing LUNs A and B automatically generates a second I/O write operation from each I/O write operation 306 directed to LUN A, and directs the second generated I/O write operation via path 307, switch "$S_1$", 308, and path 309 to the mirror object "$O_3$" 303 stored on LUN B 304. In FIG. 3, enablement of mirroring is logically represented by switch "$S_1$" 308 being on. Thus, when object-level mirroring is enabled, any I/O write operation, or any other type of I/O operation that changes the representation of object "$O_3$" 301 on LUN A, is automatically mirrored by the disk array controller to identically change the mirror object "$O_3$" 303. Mirroring can be disabled, represented in FIG. 3 by switch "$S_1$" 308 being in an off position. In that case, changes to the primary data object "$O_3$" 301 are no longer automatically reflected in the mirror object "$O_3$" 303. Thus, at the point that mirroring is disabled, the stored representation, or state, of the primary data object "$O_3$" 301 may diverge from the stored representation, or state, of the mirror object "$O_3$" 303. Once the primary and mirror copies of an object have diverged, the two copies can be brought back to identical representations, or states, by a resync operation represented in FIG. 3 by switch "$S_2$" 310 being in an on position. In the normal mirroring operation, switch "$S_2$" 310 is in the off position. During the resync operation, any I/O operations that occurred after mirroring was disabled are logically issued by the disk array controller to the mirror copy of the object via path 311, switch "$S_2$," and pass 309. During resync, switch "$S_1$" is in the off position. Once the resync operation is complete, logical switch "$S_2$" is disabled and logical switch "$S_1$" 308 can be turned on in order to reenable mirroring so that subsequent I/O write operations or other I/O operations that change the storage state of primary data object "$O_3$," are automatically reflected to the mirror object "$O_3$" 303.

Storage subsystems, such as disk arrays, are normally incorporated into larger systems of server computers and storage subsystems that together provide data processing and data storage resources to a large number of clients interconnected to server computers and storage subsystems via many different types of communications technologies. Originally, a server computer was considered to be a relatively independent processing resource that manages some number of data storage resources closely interconnected with the server. However, as the need for more robust and more reliable data processing and data storage resources have evolved in parallel with the evolution of software and computer hardware and in software applications, various methodologies for combining individual servers and data storage subsystems together to form larger, distributed data processing and data storage resources have become common. One such collective data processing and data storage resource is known as a "server cluster."

A server cluster comprises a number of interconnected and cooperating servers that together provide data processing resources and data storage resources to a large number of client computers. FIG. 4 illustrates the logical organization or a two-server server cluster. The server cluster 400 includes a first server computer 402 and a second server computer 404 interconnected via a communications medium, such as a fibre channel or specialized (e.g. SCSI) bus 406. The server cluster illustrated in FIG. 4 is an example of a modern shared-nothing cluster in which each server controls and manages, at each point in time, its own data storage resources. For example, in the server cluster shown in FIG. 4, when both servers 402–404 are operating normally, server 402 manages and controls storage devices 408–410 and server 404 manages and controls storage devices 412–414. Generally, data is stored redundantly, at least to some extent, within the cluster so that, if one or a portion of a storage device fails, the server cluster can failover to a backup storage device containing redundant data. If a server within the server cluster fails, then those applications that were running on the failed server can be restarted on another, still-operating server within the cluster, and clients previously linked to applications on the failed server can relink to the restarted applications on a still-operating server within the server cluster. When a server fails within the cluster, the disk and other data storage resources controlled and managed by the failed server are acquired, for control and management purposes, by still-operating servers within the cluster.

A well-known problem characteristic of server clusters is that, when communications between servers within the cluster fail, an operating-but-no-longer-intercommunicating server may consider itself to be the only surviving server within the cluster, and attempt to acquire the storage devices of other servers and to restart applications running on other servers of the cluster. Various scenarios involving failures of communications between servers of a server cluster are known as "split-brained" scenarios, a characterization no doubt borrowed from physiological and neurological terminology describing pathological conditions that result from disruption of nervous-system pathways interconnecting the two hemispheres of a brain.

One technique used to avoid split-brain scenarios involves establishing a quorum disk ("QD") within a server cluster for which each cluster attempts to gain control during cluster startup procedures and in response to detected cluster component failures. In the server cluster illustrated in FIG. 4, disk 416 is designated the QD. During cluster startup, both servers 402–404 contend for control of the QD 416 by issuing RESERVE commands to the QD 416. Generally, the server whose RESERVE command is first received by the QD 416 becomes the owner of the QD and, as a result, becomes the dominant server within the cluster. During cluster formation, coordinated by the dominant server, cluster configuration information may be stored on the QD, and following cluster formation, cluster-wide events may be logged to the QD. While the dominant server of a cluster maintains ownership of the QD, no other server may issue WRITE requests to the disk.

During normal cluster operations, servers exchange heartbeat messages in order to monitor the operational states of the servers and other components within the cluster. When a server fails to receive heartbeat signals from the dominant server of the cluster, due either failure of the dominant server or failure of communications interconnections linking the server to the dominant server, the server may transition to a challenging server in order to attempt to gain control of the cluster, by issuing a RESERVE command to the QD, and then, if successful, reform the cluster and become the new dominant server. The challenging server issues the RESERVE command and, if the RESERVE command succeeds, reforms the cluster as the new dominant server. If the RESERVE command fails, the challenging server may issue a REST command and wait, for some period of time, to detect whether or not another server issues a subsequent RESERVE command in response. If no subsequent RESERVE command is issued by another server to the QD, then the challenging server may issue a RESERVE command directed to the QD, gain ownership of the QD, and reform the cluster. However, if the dominant server of the cluster issues a RESERVE command to the QD in response to the server's RESET command, then the dominant server maintains control over the cluster. By using a quorum-disk-contention protocol in each server of the cluster, split-brain scenarios can be avoided.

The logical organization of a two-server cluster, illustrated in FIG. 4, can be achieved via numerous different physical hardware implementations. FIG. 5 illustrates a small computer systems interface ("SCSI") implementation. In the SCSI implementation, servers 402 and 404 are linked together and are linked to the various storage resources of the cluster 408–410, 412–414 and 416, via a SCSI bus 502. FIG. 6 illustrates a fibre-channel implementation of the two-server cluster illustrated in FIG. 4. In FIG. 6, servers 402 and 404 are linked through fibre channel switches 602 and 604 to the data storage resources 408–410, 412, 414, and 416. The fibre-channel implementation provides a more robust interconnection between components of the server cluster that, in turn, substantially increases the availability of data processing and data storage resources provided by the cluster system.

Although server cluster technology is a vast improvement over dependent, non-cooperating servers, commonly available clustered server systems cannot guarantee non-stop provision of data processing and data-storage resources. If, for example, cluster administrators and applications that run on the server cluster do not deliberately and carefully maintain redundant data, the failure of a data-storage device may be unrecoverable. Certain failures within interconnecting communications media, or failures of multiple components, such as multiple servers, may also be at least temporarily unrecoverable. Perhaps the greatest vulnerability to the clustered server systems described with reference to FIGS. 4–6 is that the QD 416 represents a potential single point of failure. If the QD fails, or the communications medium connecting the QD to cluster servers fails, then the server cluster also fails. A new cluster can be started by choosing another disk as the QD, but in commonly available cluster technologies, restarting the cluster using a new QD requires manual intervention by human administrators. However, the intent of cluster technologies is to provide reliable operation and automated failover following automated detection of component failure. Therefore, manufacturers, designers, and users of server cluster technologies have recognized the need for removing the single point of failure represented by the QD in currently available server clusters.

SUMMARY OF THE INVENTION

One embodiment of the present invention enhances the reliability and robustness of a server cluster by removing the single point of failure represented by the QD used to arbitrate management of a server cluster. In currently available server cluster technologies, a single disk drive or logical unit is designated as the QD. A server within the server cluster acquires ownership of the QD and is thereby promoted to become the dominant server of the server cluster. It is the dominant server's responsibility to manage cluster initialization and oversee cluster maintenance functions. Failure of the single QD causes currently available server clusters to fail, requiring a fully or partially manual cluster restart procedure. In one embodiment of the present invention, the functionality of a QD is distributed between two physical mirrored disk drives or mirrored LUNs. The failure of either one of the two mirrored disk drives or mirrored LUNs can be automatically compensated for by the server cluster, without interruption of data processing and data storage services provision to cluster clients and users. The two mirrored disk drives or LUNs that together compose a distributed QD can be located in geographically dispersed locations to create a geographically distributed QD in order to protect a server cluster from large-scale, but geographically localized, threats, such as earthquakes, floods, and fires. A distributed or geographically dispersed QD that represents another embodiment of the present invention comprises a dominant LUN associated with a uniform request queue and a subordinate LUN that mirrors the dominant LUN. Because the subordinate LUN is a mirror copy of the dominant LUN, failure of the dominant LUN can be automatically compensated for within the server cluster by immediately failing over to the subordinate LUN. Failure of the subordinate LUN is compensated for by forwarding all requests or operations directed to the subordinate LUN to the dominant LUN.

DETAILED DESCRIPTION OF THE INVENTION

One embodiment of the present invention represents an enhancement to currently available server cluster technologies that distributes the functionality of a QD between two separate disk drives or LUNs in order to remove the single point of failure represented by the QD of currently available server cluster systems. Distributing a QD between multiple LUNs or disk drives, rather than employing a single-disk-drive QD, ensures that a server cluster can immediately failover processing of I/O requests directed to the QD in the event of failure of one of the disk drives or LUNs that together compose the distributed QD of one embodiment of the present invention. However, because a single QD within a currently available server cluster system represents a single object of contention for which multiple servers vie during initialization and restart procedures, a distributed QD must reliably function as a single virtual QD, or, in other words, as a single point of contention for the servers within a server cluster.

Figure 1:
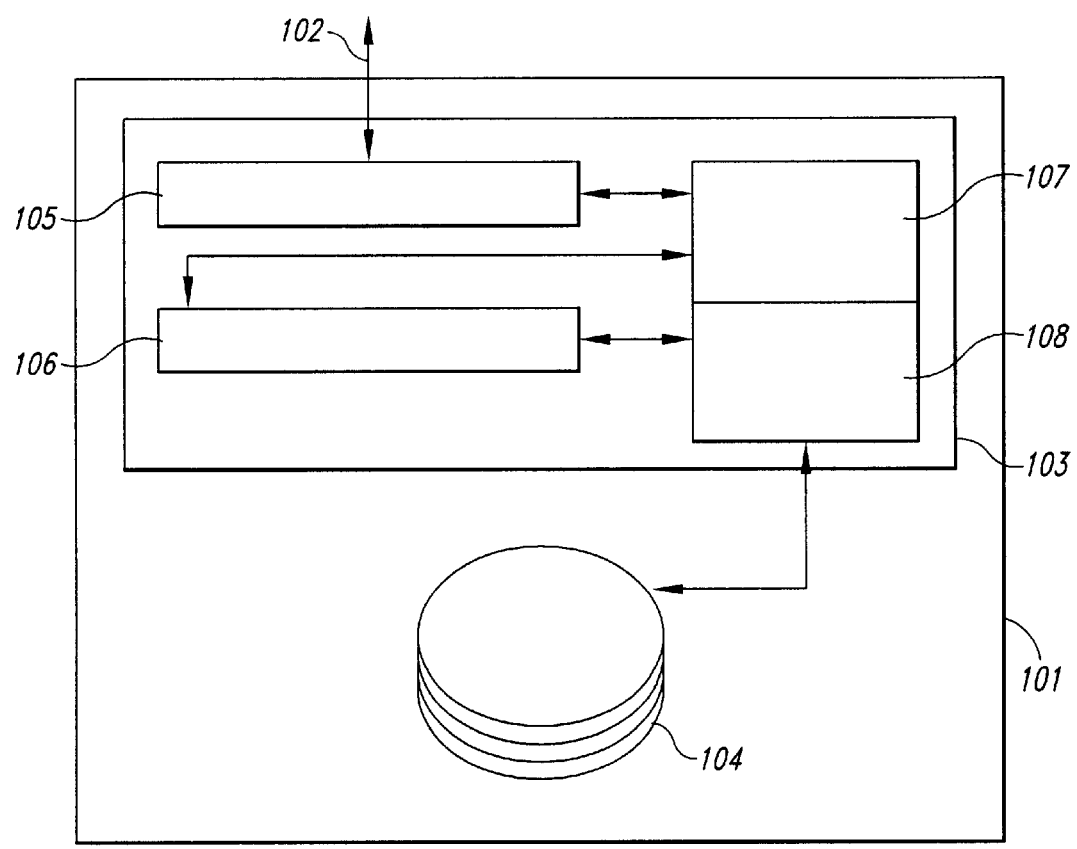
FIG. 1 is a block diagram of a standard disk drive.
Figure 2:
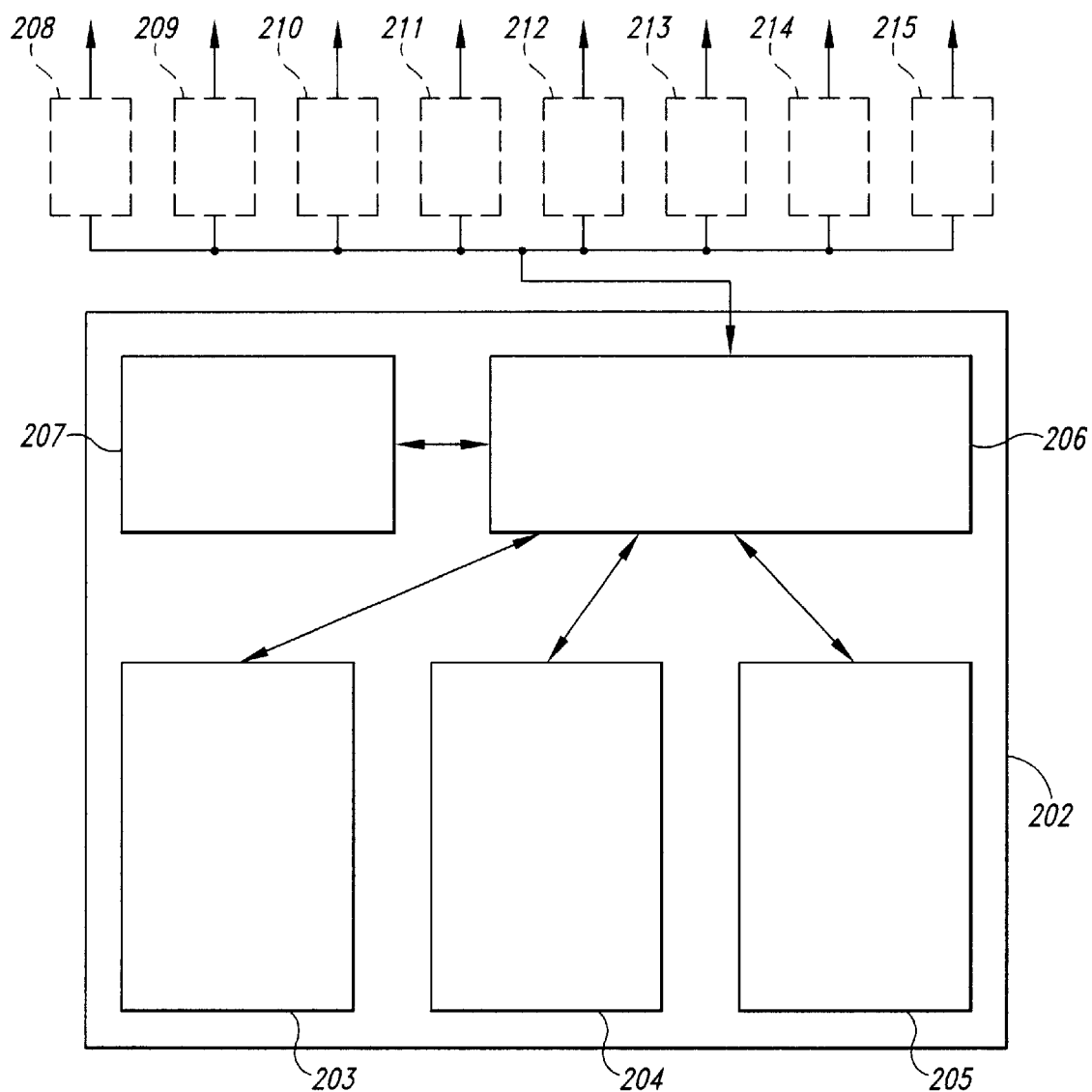
FIG. 2 is a simple block diagram of a disk array.
Figure 3:
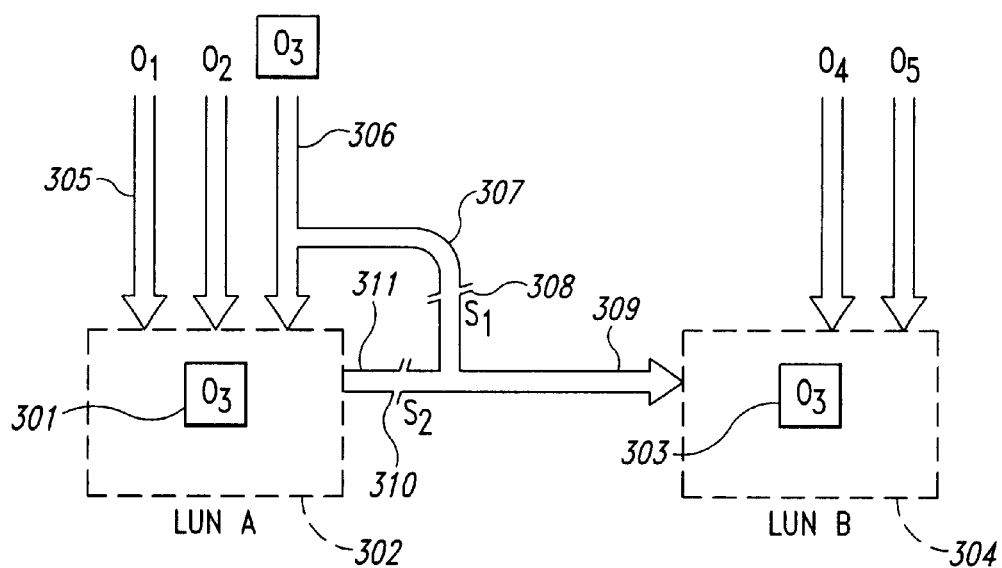
FIG. 3 illustrates mirroring within a disk array.
Figure 4:
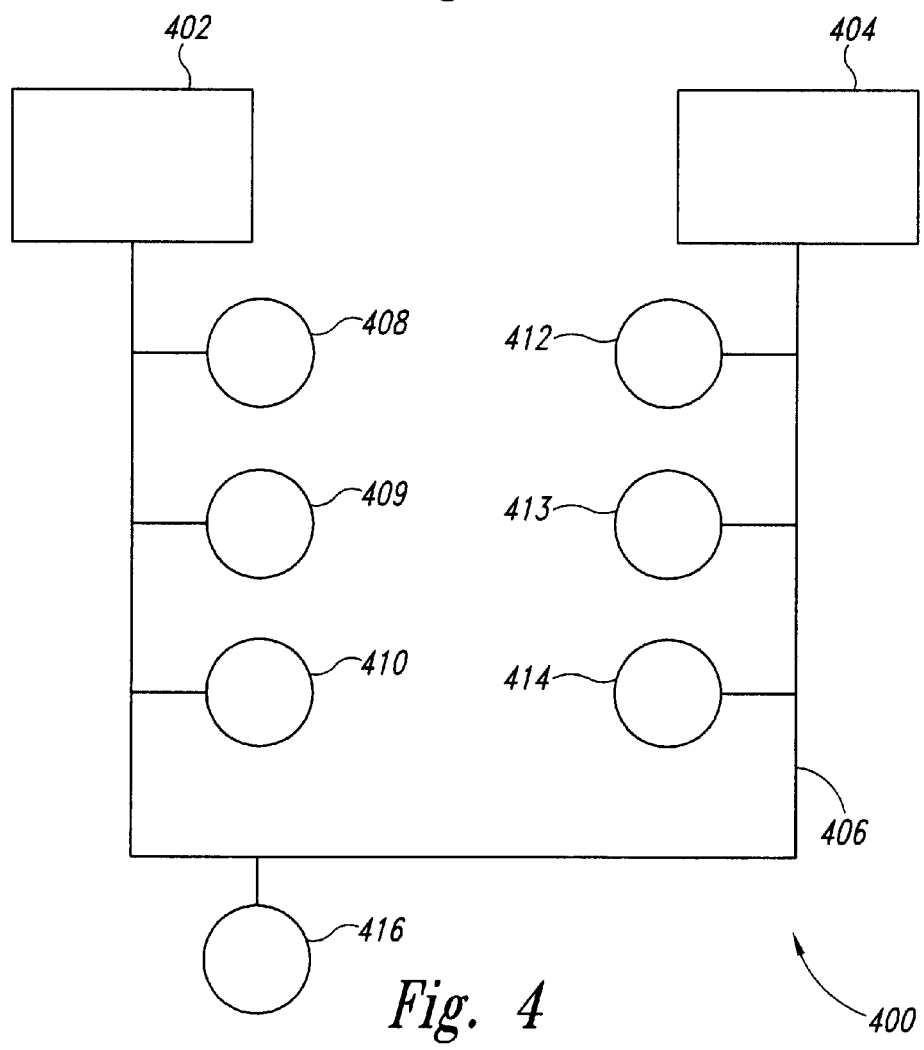
FIG. 4 shows the logical organization or a two-server server cluster.
Figure 5:
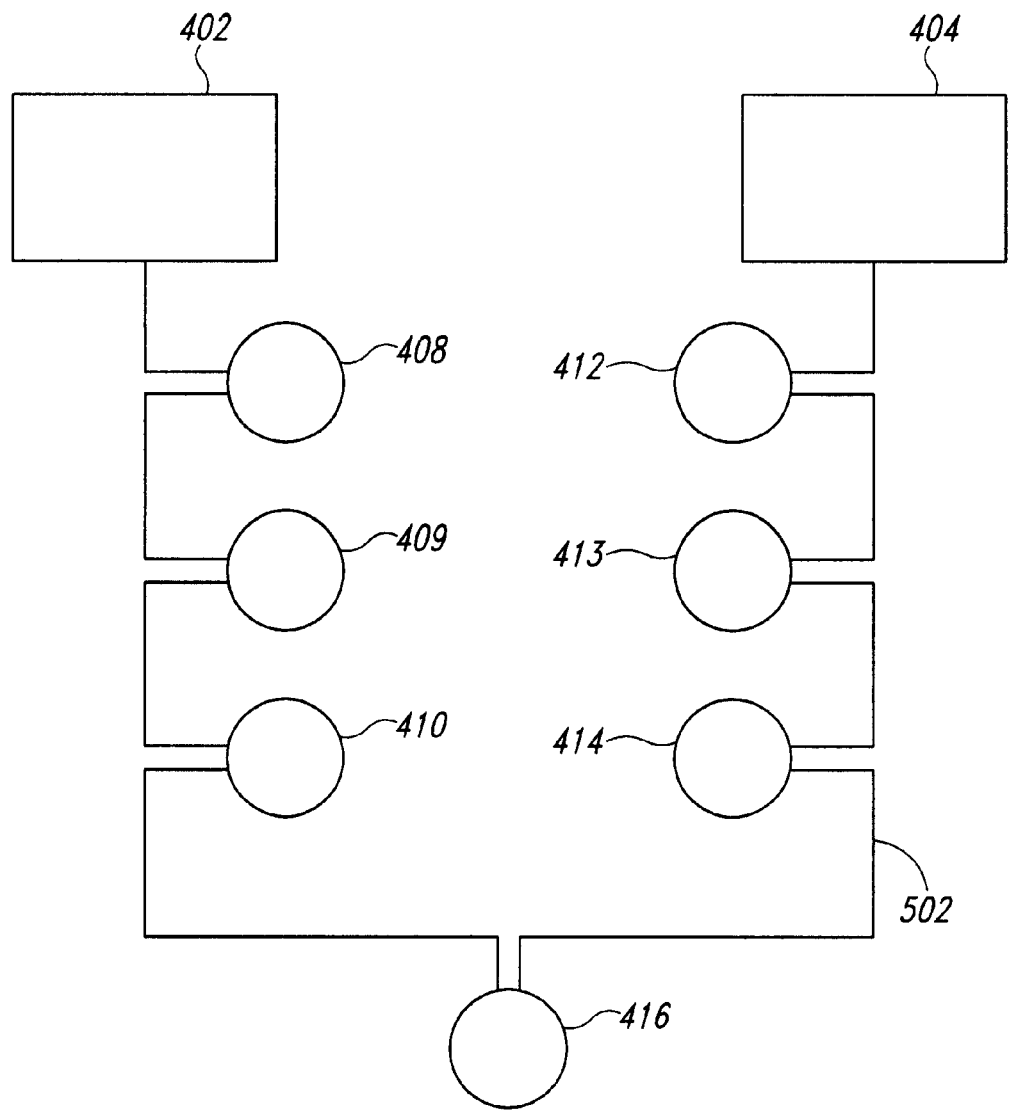
FIG. 5 shows a small computer systems interface ("SCSI") implementation of a two-server server cluster.
Figure 6:
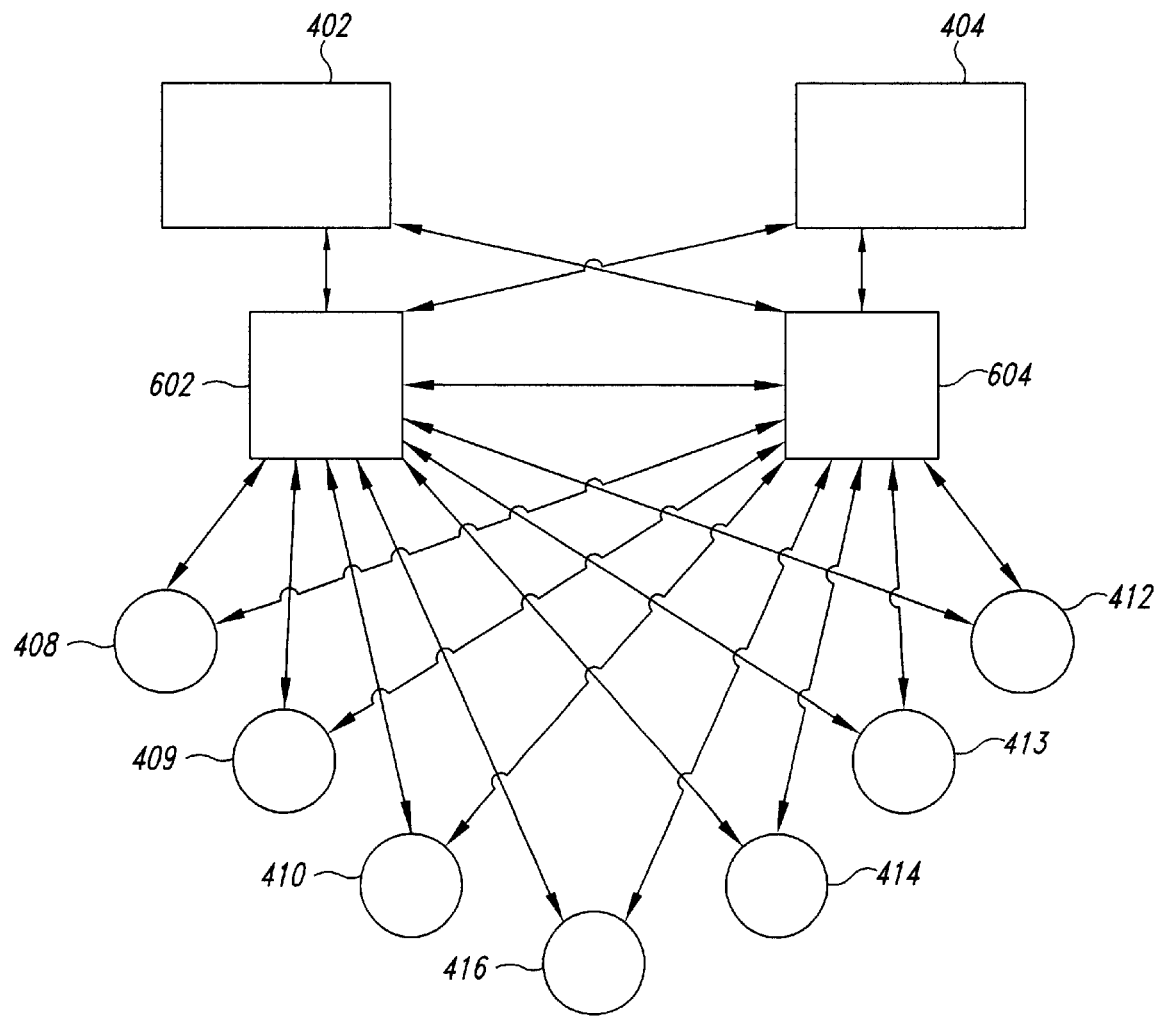
FIG. 6 shows a fibre-channel implementation of the two-server server cluster illustrated in FIG. 4.
Figure 7:
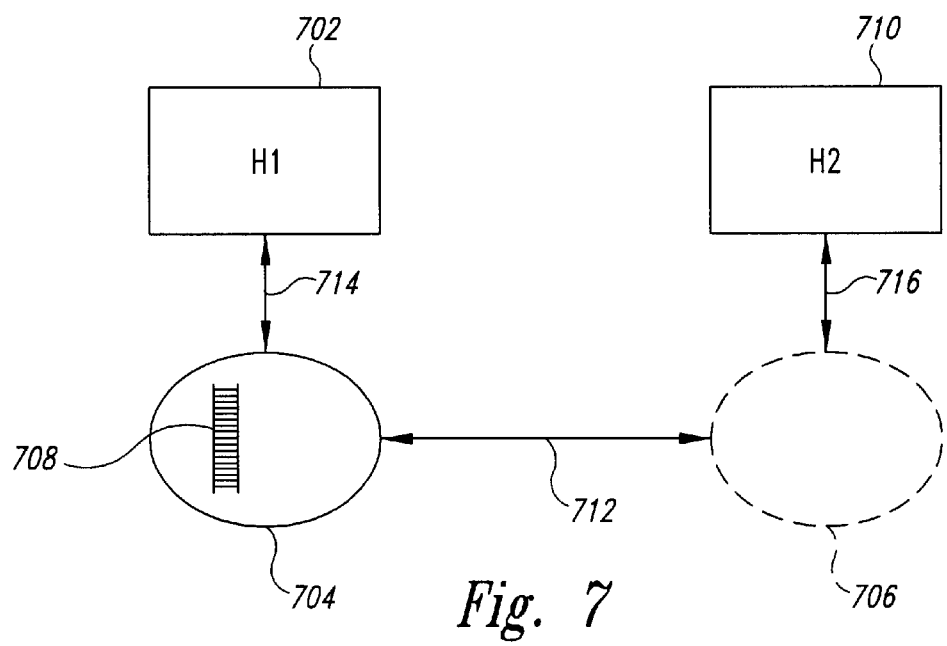
FIG. 7 shows the logical components of a distributed QD within a two-server server cluster.

FIG. 7 illustrates the logical components of a distributed QD within a two-server server cluster. A first server 702, referred to in the following descriptions as server "H1," is the dominant server of the cluster and has acquired ownership of a dominant LUN 704 that, together with a subordinate LUN 706, composes a distributed QD. The controller that controls the dominant LUN 704 also maintains a unified request queue 708 associated with the dominant LUN 704. A second server 710, referred to as server "H2" in subsequent discussions, generally access the distributed QD via subordinate LUN 706. The subordinate LUN 706 is a mirror of dominant LUN 704. The subordinate LUN is interconnected with the dominant LUN via a communications medium 712, and servers "H1" and "H2" are interconnected with dominant LUN 704 and subordinate LUN 706 via communications media 714 and 716, respectively.

Figure 8:
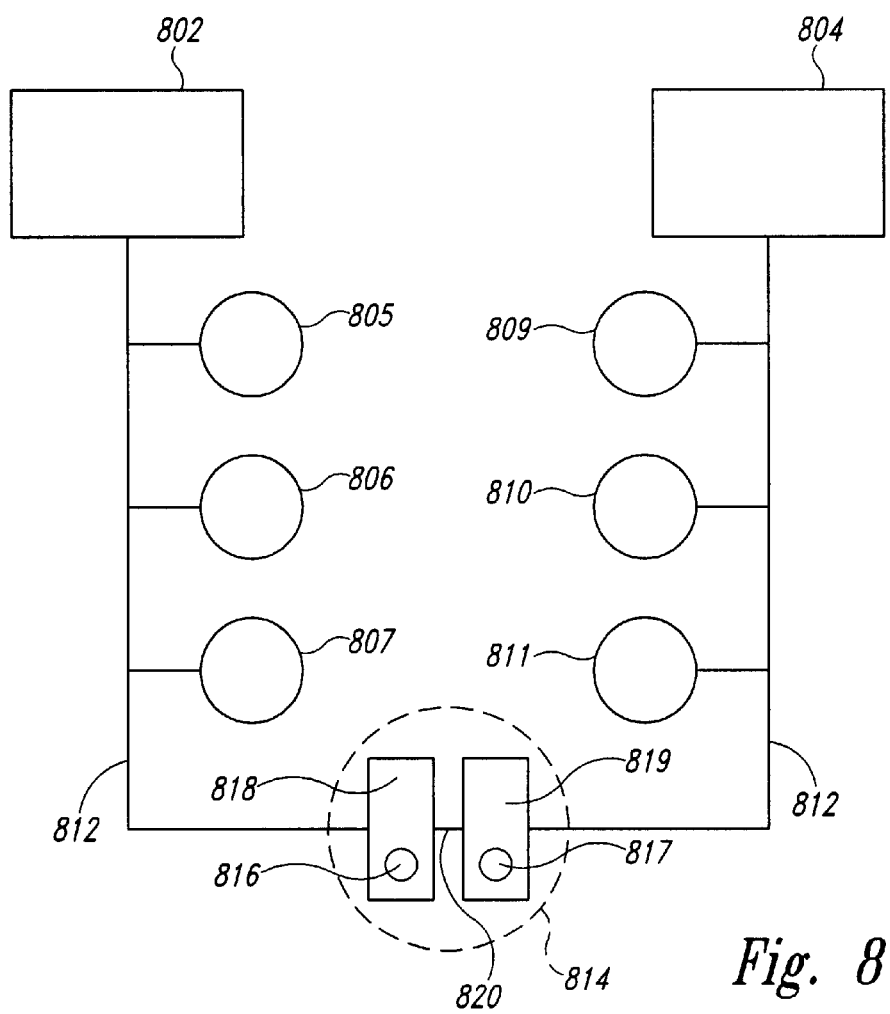
FIG. 8 shows one physical embodiment of a server cluster employing a distributed QD.

FIG. 8 illustrates one physical embodiment of a server cluster employing a distributed QD. Two servers 802 and 804 are linked together, and to data-storage devices 805–807 and 809–811, via a communications medium such as a SCSI bus 812. A dispersed QD is included in the server cluster, and comprises a dominant LUN 816 and a subordinate LUN 817 within two disk arrays 818 and 819. Communications link 820 that interconnects disk arrays 818 and 819 is not drawn to scale and may of cross-metropolitan lengths or longer.

Figure 9:
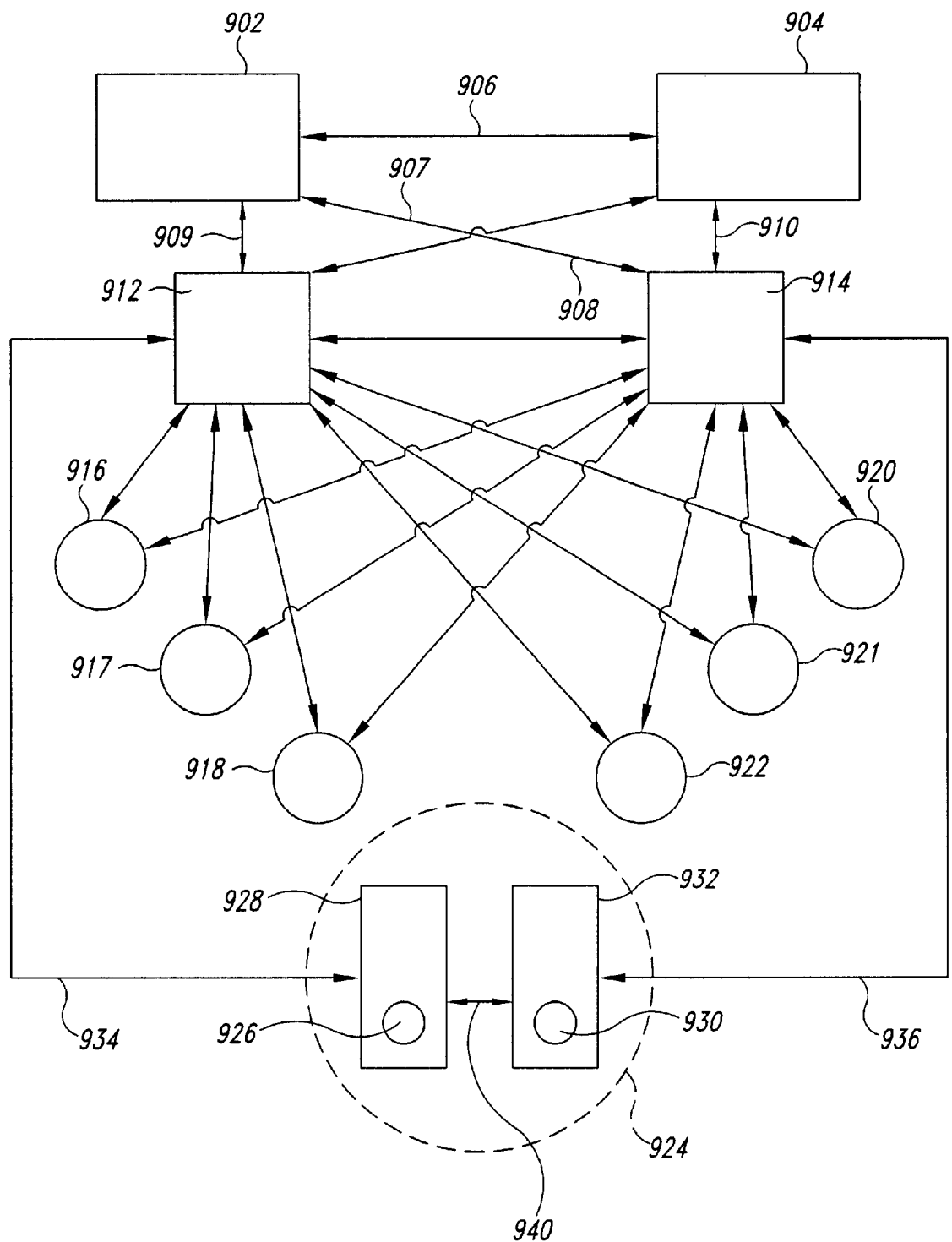
FIG. 9 shows a fibre-channel implementation of a preferred embodiment of the present invention.

A fibre-channel implementation of a preferred embodiment of the present invention is shown in FIG. 9. In FIG. 9, two servers 902 and 904 are interconnected via a LAN or other communications medium 906 as well as via fibre channel interconnections 907–910. The fibre channel includes two fibre channel switches 912 and 914 to which data-storage devices 916–918, associated with server 902, and data-storage devices 920–922, associated with server 904, are interconnected via numerous fibre channel links. The server cluster illustrated in FIG. 9 includes a distributed QD 924 comprising a dominant LUN 926 within a first disk array 928 and a subordinate LUN 930 within a second disk array 932, disk arrays 928 and 932 interconnected with fibre channel switches 912 and 914 via fibre channel links 934 and 936, respectively. The two disk arrays 928 and 932 that contain the dominant and subordinate LUNs 926 and 930 are interconnected via another high-speed interconnection 940, such as an enterprise server connection ("ESCON") link or a fibre-channel link.

In the preferred embodiment shown in FIG. 9, the components of the server cluster are richly and redundantly interconnected via different communications media so that no single interconnection or link represents a single point of failure. Moreover, the QD component of the server cluster is distributed over two separate LUNs in two separate disk arrays that may be physically separated by a considerable distance to form a geographically dispersed QD, completely eliminating the single point of failure represented by the single QD employed in currently available server cluster systems. The subordinate LUN 930 is mirrored from the dominant LUN 926 with well-known disk array mirroring functionality. The two LUNs together compose a virtual QD that behaves within the server cluster identically to a single QD of currently available server cluster systems, with the exception that one of the two LUNs that compose virtual QD may fail without causing an interruption or failure of data processing and data storage services provided by the server cluster.

In order for a distributed QD to properly emulate a single QD, the subordinate LUN of the distributed QD needs to be a faithful copy of the dominant LUN, with all operations directed to the dominant LUN concurrently and consistently carried out on both the dominant LUN and the subordinate LUN. Many well-known procedures and technologies can be applied to provide concurrent mirroring and consistency between the dominant and subordinate LUNs, including, but not limited to, well-known two-phase commit protocols and other reliable transaction processing technologies currently employed in database management systems and in on-line transaction systems.

Figure 10:
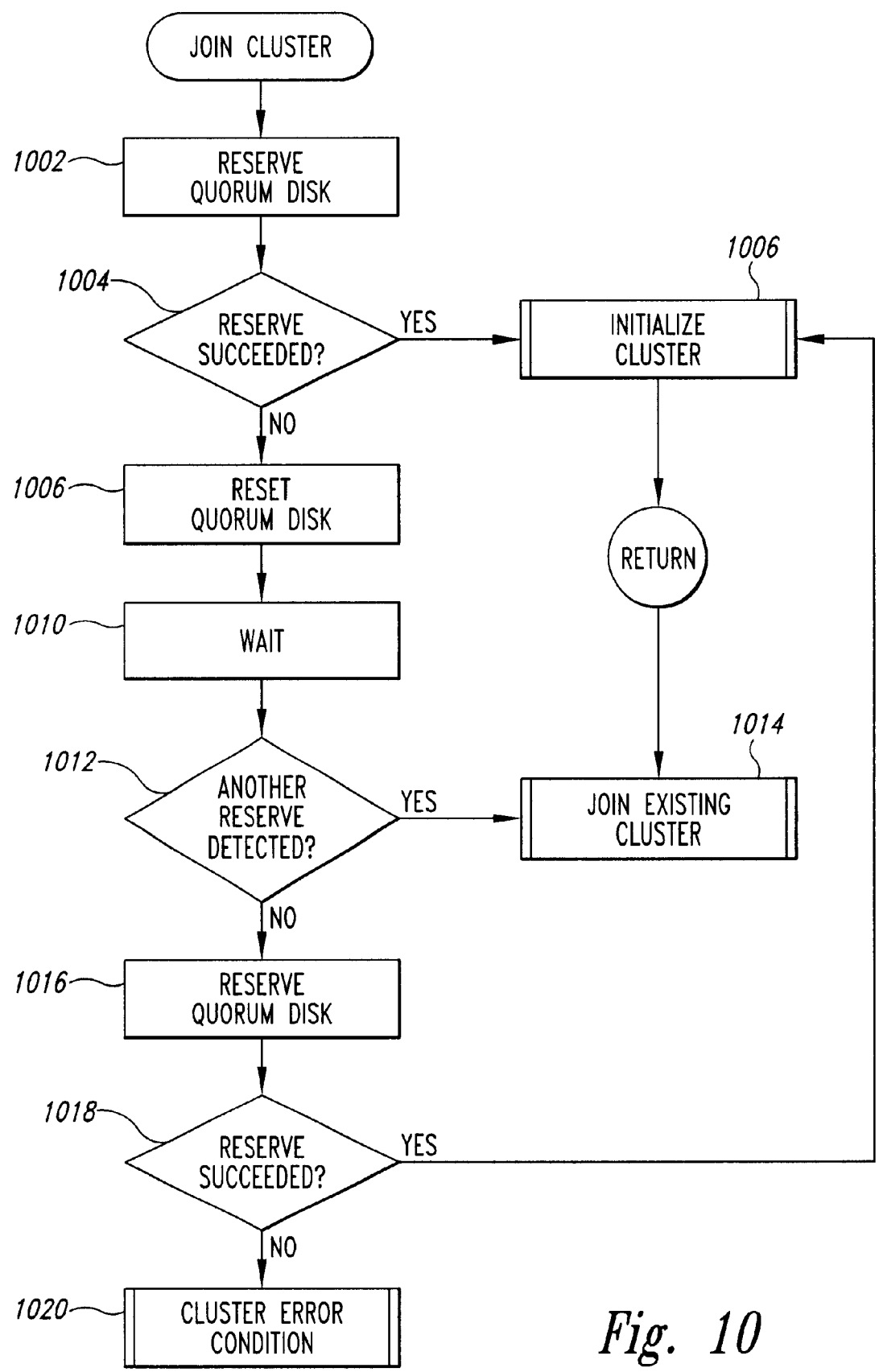
FIG. 10 is a flow-control diagram that illustrates QD contention carried out by a server seeking to join a server cluster.

FIG. 10 is a flow-control diagram that illustrates QD contention carried out by a server seeking to join a server cluster. In step 1002, the server issues a RESERVE command to the QD. In step 1004, the server determines, by inspecting status returned from the QD, whether or not the RESERVE command succeeded. If the RESERVE command succeeded, then, in step 1006, the server carries out a cluster initialization procedure to form and initialize the cluster, since the server is the first server of the cluster to successfully reserve the QD. If the RESERVE command failed, as detected in step 1004, then, in step 1008, the server issues a RESET command to the QD and then waits, in step 1010, for a fixed period of time. In step 1012, the server determines whether another server has issued a RESERVE command to the QD since the server issued the RESET command to the QD in step 1008. If another RESERVE command is detected in step 1012, then the server cluster has already been initialized and is operating, and the server, in step 1014, carries out a cluster joining procedure that may involve a cluster joining protocol or dialog with the dominant server of the cluster. If another RESERVE command is not detected in step 1012, then the server issues a second RESERVE command to the QD in step 1016. If the second RESERVE command succeeds, as detected in step 1018, then the server embarks on cluster initialization in step 1006. The last-described scenario occurs when the cluster has failed due to a dominant server failure, for example. If the second RESERVE command does not succeed, as detected in step 1018, then a more serious failure condition has occurred, and the server calls an appropriate severe error condition routine in step 1020.

A distributed QD must faithfully emulate the RESERVE and RESET commands employed in the cluster joining protocol diagrammed in FIG. 10. In addition, a distributed QD must faithfully carry out all input/output ("I/O") read and write operations requested by the servers within the server cluster, and must immediately failover to single-LUN operation in the event that either the dominant or subordinate LUN experiences failure. A distributed-QD/ geographically-dispersed-QD implementation is described below with reference to flow-control diagrams. The implementation is described at an intermediate level, omitting well-known details of two-phase commit protocols and reliable transaction processing technologies that may be employed at lower levels in order to achieve concurrent update and consistency between the dominant and subordinate LUNs of a distributed QD.

Figure 11:
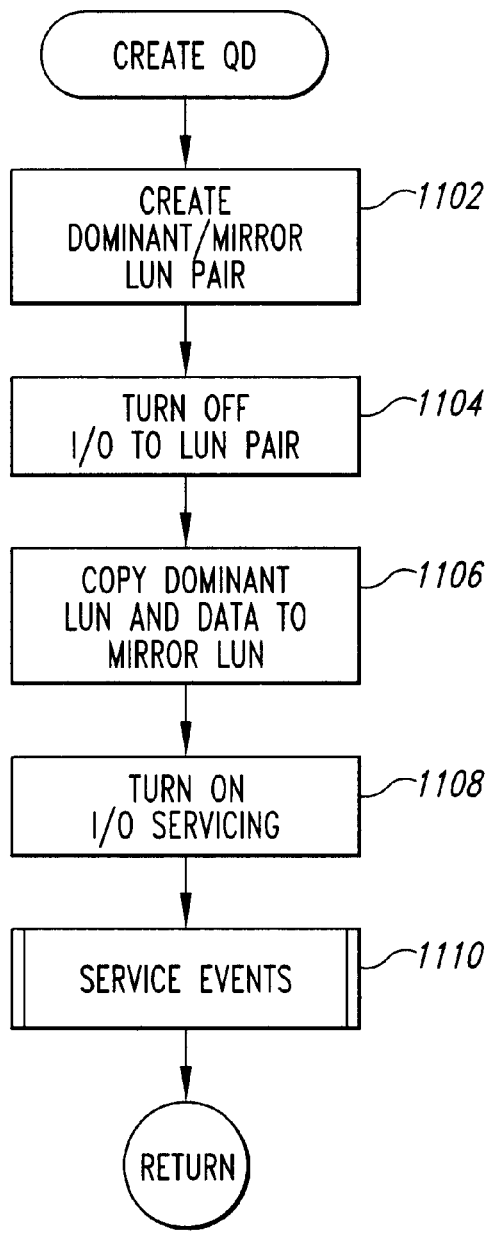
FIG. 11 is a flow-control diagram for creation of a distributed quorum disk.

FIG. 11 is a flow-control diagram for creation of a distributed QD. In step 1102, standard disk array interface routines are employed by a system administrator, or possibly by a script program or other automated tool, to create a dominant LUN/mirror LUN pair, with the dominant LUN and mirror LUN residing in distinct and separate disk arrays or other storage systems. When certain types of disk arrays are employed, steps 1104–1008, described next, may be automatically included in step 1102. In step 1104, the dominant/mirror LUN pair is disabled from accepting I/O requests or other commands while data stored on the dominant LUN is copied to the mirror LUN in step 1106. When all the data stored on the dominant LUN has been faithfully copied to the mirror LUN, I/O request servicing and command servicing are re-enabled for the dominant LUN/mirror LUN pair in step 1108. Finally, the routine "server events" is called, in step 1110 that represents I/O and event servicing by the QD. Note that the routine "create QD," illustrated in FIG. 11, may be implemented as a routine call or command within the interface of a disk array or cluster management utility. As with any such routine call or command interface, many different types of parameters may be supplied in order to specify the composition and desired behavioral particularities of the QD to be created via the routine call or command interface.

Figure 12:
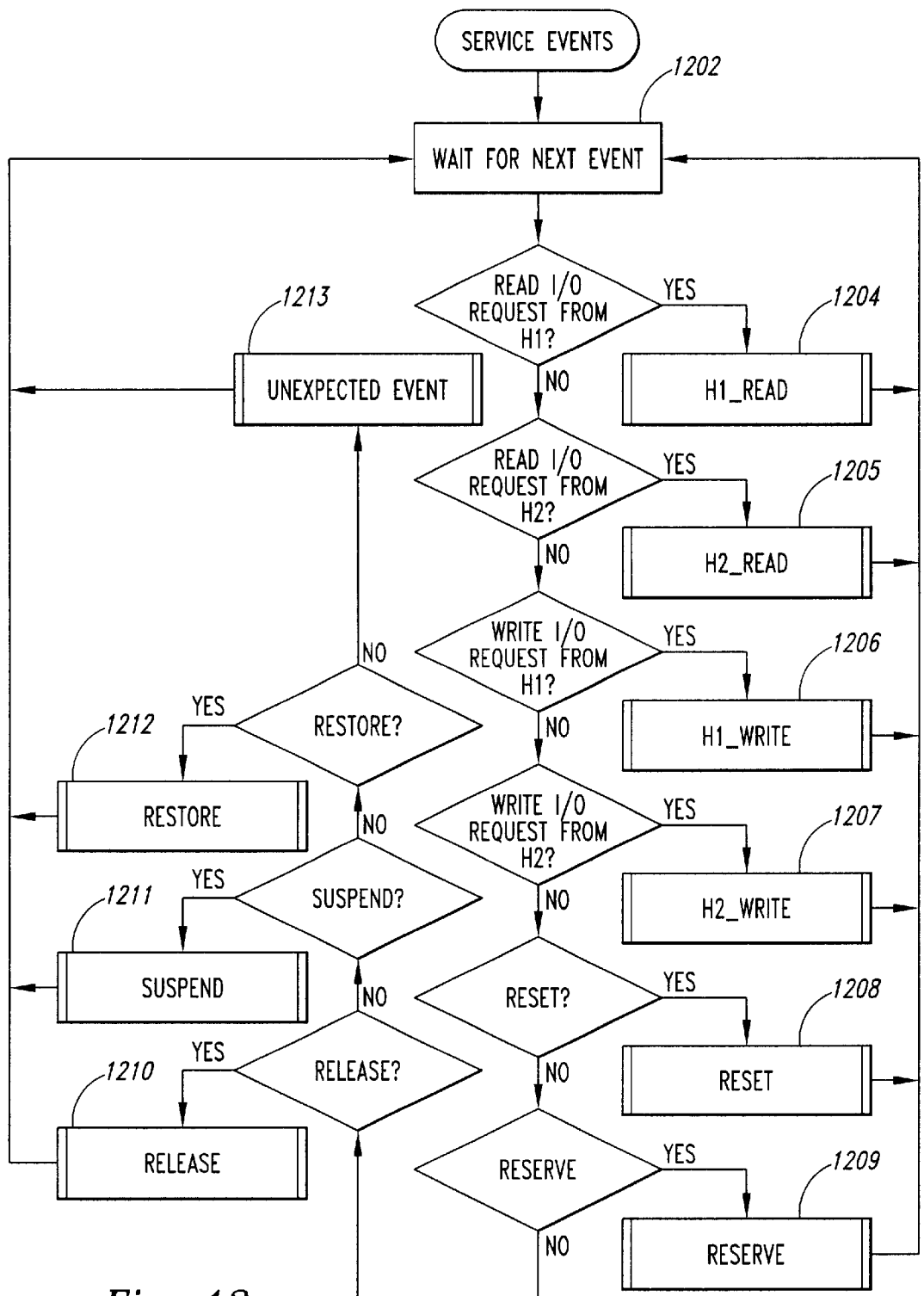
FIG. 12 is a flow-control diagram for the routine "service events" called in step 1110 of the routine "create QD," illustrated in FIG. 11.

FIG. 12 is a flow-control diagram for the routine "service events," called in step 1110 of the routine "create QD," illustrated in FIG. 11. In the following discussion, the names of the components of the logical model illustrated in FIG. 7, including servers "H1" and "H2," the distributed QD, and the unified request queue, are employed in routine names and descriptions of steps and operations undertaken to carry out event and I/O handling. The routine "service events" is essentially a continuous loop in which the QD waits for a next event, in step 1202, and then responds to the event by calling an appropriate routine, in steps 1204–1213. The events for which the QD waits include: (1) a READ request from the dominant server "H1," in response to which the routine "H1_read" is called in step 1204; (2) a READ request from a subordinate server "H2," in which case the routine "H2_read" is called in step 1205; (3) a WRITE request from the dominant server "H1," in which case the routine "H1_write" is called in step 1206; (4) a WRITE request from the subordinate server "H2," in which case the routine "H2_write" is called in step 1207; (5) a RESET command from either server "H1" or server "H2," in which case the routine "reset" is called in step 1208; (6) a RESERVE command called by either server "H1" or "H2," in which case the routine "reserve" is called in step 1209; (7) a RELEASE command issued by either server "H1" or "H2," in which case the routine "release" is called in step 1210; (8) a SUSPEND command that may be internally or externally generated upon detection of certain server cluster component failures, in which case the routine "suspend" is called in step 1211; (9) a RESTORE command either externally or internally generated in response to the correction of a failure condition related to a server cluster component, in which case the routine "restore" is called in step 1212; and (10) an unexpected event, in which case an unexpected event handling routine is called in step 1213. The routines called from the routine "service events," illustrated in FIG. 12, are described with reference to FIGS. 13–21, below.

Figure 13:
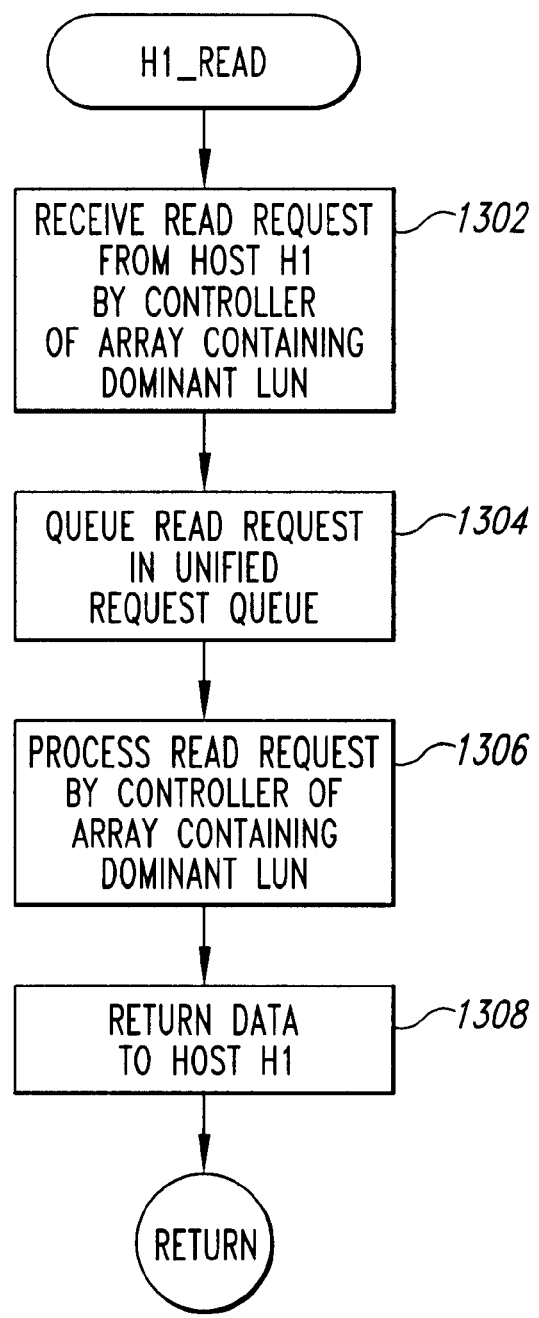
FIG. 13 is a flow-control diagram for the routine "H1__ read."

FIG. 13 is a flow-control diagram for the routine "H1_ read." In step 1302, the controller of the disk array containing the dominant LUN of the QD receives a READ request from server "H1." In step 1304, the READ request is queued to the unified request queue associated with the dominant LUN. In step 1306, after all I/O requests ahead of the received READ request have been processed, the READ request is dequeued from the unified request queue and processed by the controller of the disk array containing the dominant LUN. Finally, in step 1308, the data read from the dominant LUN is returned to server "H1" by the disk array controller. Thus, a READ request issued to the QD by the dominant server of the server cluster is processed in standard fashion by the dominant LUN.

Figure 14:
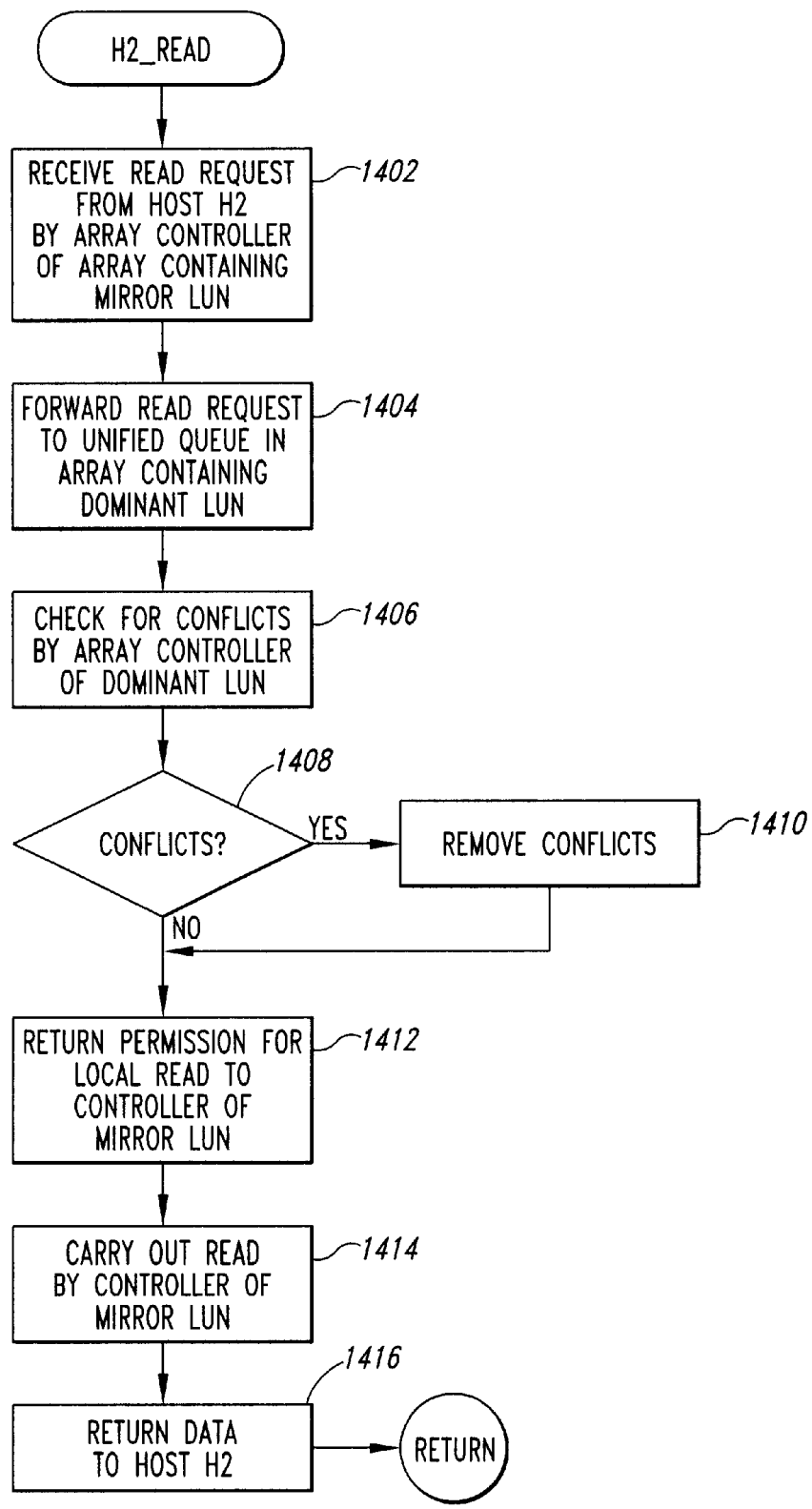
FIG. 14 is a flow-control diagram for the routine "H2__ read."

FIG. 14 is a flow-control diagram for the routine "H2_ read." In step 1402, a READ request is received by the controller of the disk array containing the mirror LUN of the QD that was issued by the subordinate server "H2." In step 1404, the controller of the disk array that contains the mirror LUN of the QD forwards the READ request to the disk array controller of the disk array containing the dominant LUN of the QD, where the forwarded READ request is queued to the unified request queue. In step 1406, the controller of the disk array containing the dominant LUN checks for any conflicts arising from concurrently issued WRITE requests that may overlap the forwarded READ request. If any conflicts are discovered, in step 1408, then the controller for the disk array containing the dominant LUN of the QD may take steps to remove the conflicts, including first processing the WRITE requests, in step 1410. Then, in step 1412, the controller of the disk array containing the dominant LUN returns a permission message to the controller of the disk array containing the mirror LUN that authorizes that controller to carry out the READ request locally on the mirror LUN. In step 1414, the controller of the disk array containing the mirror LUN carries out the READ request initially received in step 1402 and, in step 1416, returns the data read from the mirror LUN to server "H2."

Figures 15, 16:
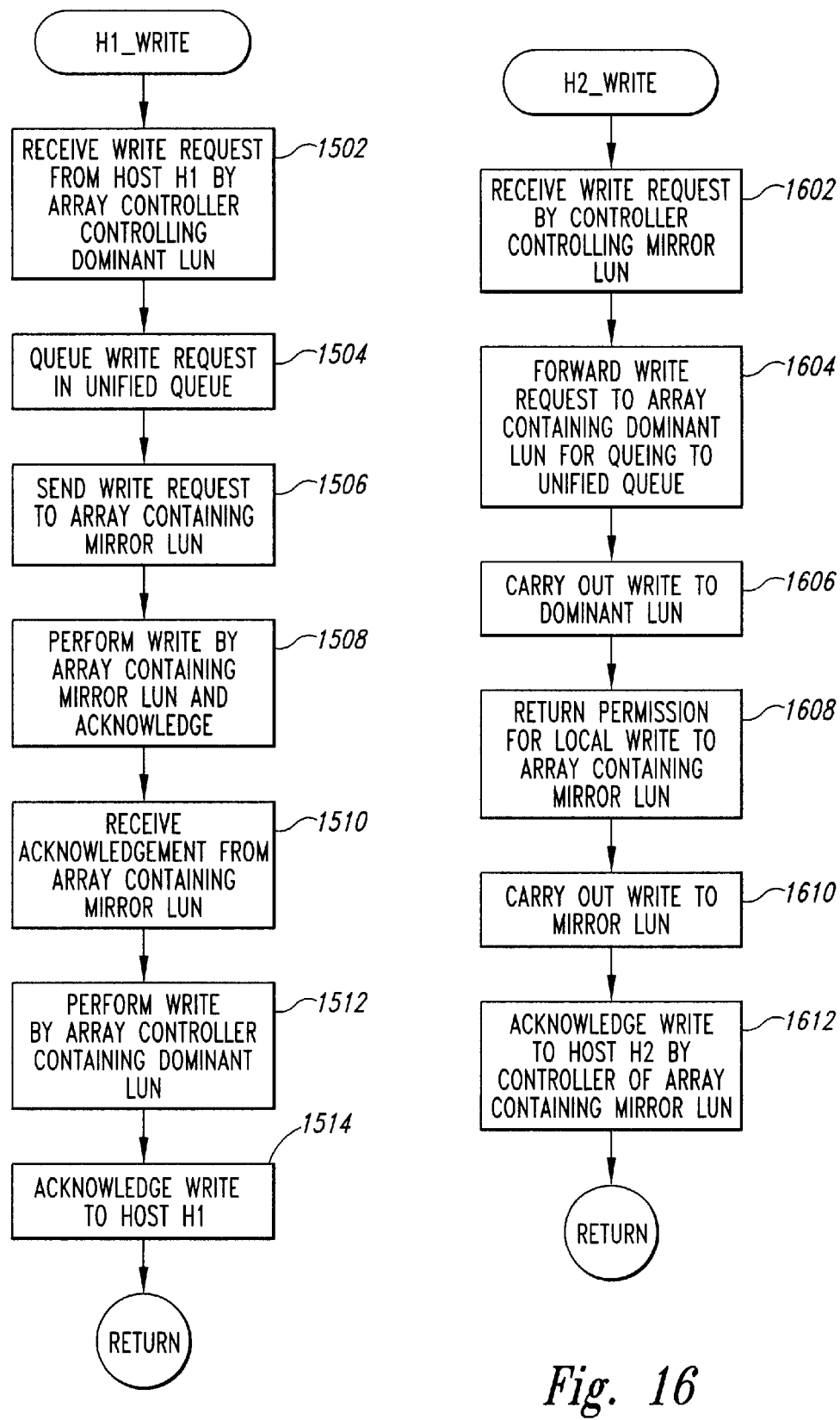
FIG. 15 is a flow-control diagram of the routine "H1_write."
FIG. 16 is a flow-control diagram of the routine "H2_write."

FIG. 15 is a flow-control diagram of the routine "H1_ write." In step 1502, the controller of the disk array containing the dominant LUN receives a WRITE request from server "H1." In step 1504, the controller of the disk array containing the dominant LUN queues the WRITE request to the unified request queue, and, in step 1506, the controller forwards the WRITE request to the controller of the disk array containing the mirror LUN. In step 1508, the controller of the disk array containing the mirror LUN performs the write to the mirror LUN and returns an acknowledgement of completion of the WRITE request back to the disk array containing the dominant LUN. In step 1510, the controller of the disk array containing the dominant LUN receives the acknowledgement from the controller of the disk array containing the mirror LUN and, in step 1512, performs the write to the dominant LUN. Finally, in step 1514, the controller of the disk array containing the dominant LUN acknowledges the completion of the WRITE request to server "H1." Thus, as with all I/O operations, the QD ensures that both the mirror LUN and dominant LUN are updated together before returning a completion status message to a requesting server computer. As noted above, a two-phase commit protocol or other transaction processing technology may be employed below the level of detail described in FIG. 15 in order to guarantee that both the mirror LUN and dominant LUN are concurrently updated, in a single operation, or that, when a WRITE request fails, neither the mirror LUN nor the dominant LUN are updated.

FIG. 16 is a flow-control diagram for the routine "H2_write." In step 1602, the controller of the disk array containing the mirror LUN receives a WRITE request from server "H2," and forwards the WRITE request to the disk array containing the dominant LUN in step 1604. The WRITE request is queued to the unified request queue by the controller of the disk array containing the dominant LUN. When all preceding I/O requests have been handled by that disk controller, the forwarded WRITE request is dequeued from the unified request queue, in step 1606, by the controller of the disk array containing the dominant LUN, and the corresponding WRITE operation is carried out by writing information to the dominant LUN. When the write is complete, the controller of the disk array containing the dominant LUN, in step 1608, returns permission to the controller of the disk array containing the mirror LUN to execute a corresponding write to the mirror LUN. In step 1610, upon receiving permission from the controller of the array containing the dominant LUN, the controller of the array containing the mirror LUN carries out the write to the mirror LUN and finally, in step 1612, returns a status message to server "H2" to indicate to server "H2" the completion status for the WRITE request.

Figures 17, 18:
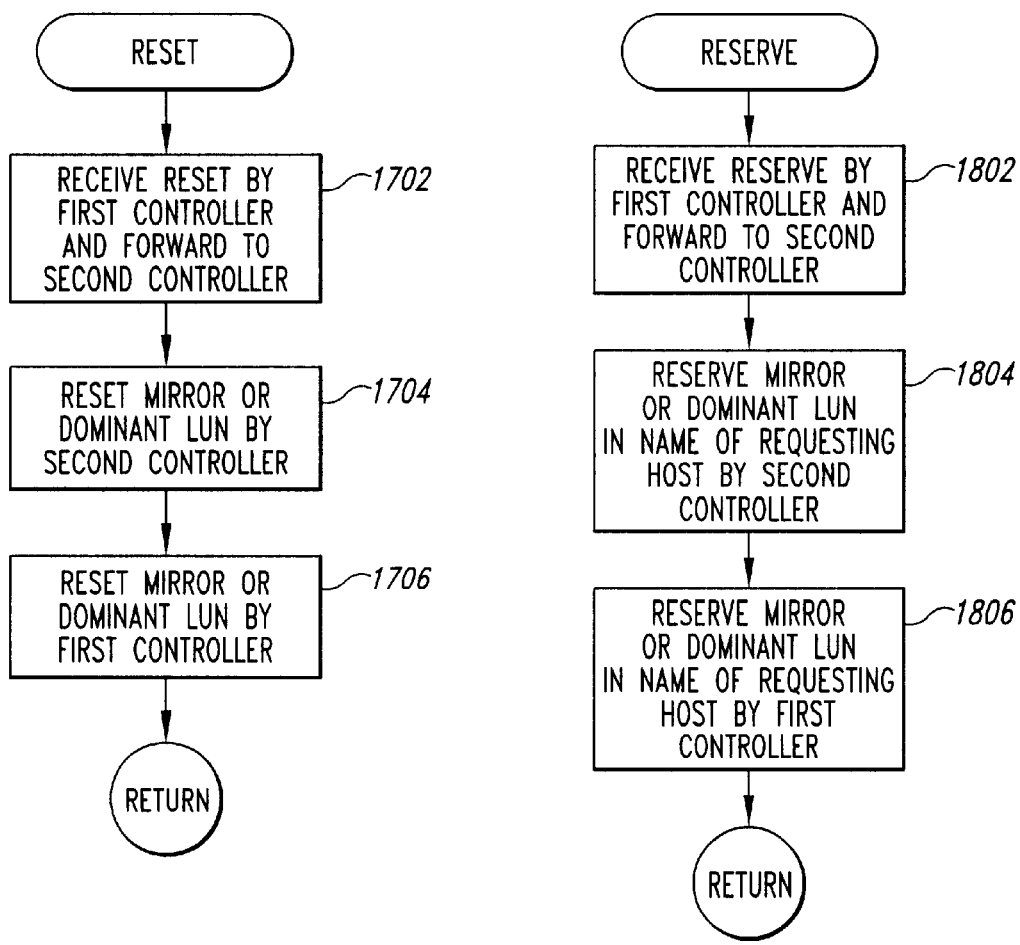
FIG. 17 is a flow-control diagram for the routine "reset."
FIG. 18 is a flow-control diagram for the routine "reserve."

FIG. 17 is a flow-control diagram for the routine "reset." In step 1702, a first controller of a disk array containing one of the LUNs that compose the QD receives a RESET command and forwards the RESET command to a second controller of the disk array that contains the other of the pair of LUNs that compose the QD. In step 1704, the second controller receives the forwarded RESET command, carries out the RESET command and, in step 1706, the first controller carries out a RESET command. Thus, a RESET command issued to either disk array of the two disk arrays that compose the QD results in a reset of both LUNs of the QD.

FIG. 18 is a flow-control diagram for the routine "reserve." In step 1802, a RESERVE command is received by one of the two controllers on one of the two disk arrays that include LUNs of the QD, and forwards the RESERVE command to the other controller of the two controllers controlling LUNs of the QD. In step 1804, the first controller to receive the RESERVE command executes the RESERVE command, and, in step 1806, the second controller to which the RESERVE command was forwarded executes the RESERVE command. Note that, again, a two-phase commit or reliable transaction-processing procedure may be invoked to guarantee an all-or-nothing reserve of both LUNs of the QD in response to receipt of a RESERVE command by either disk array.

Figure 19:
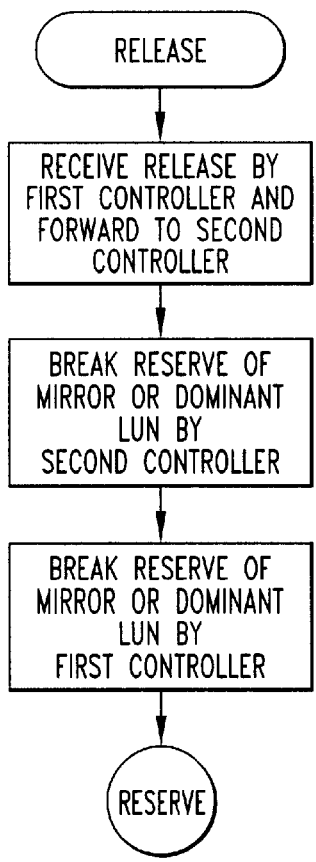
FIG. 19 is a flow-control diagram for the routine "release."

FIG. 19 is a flow-control diagram for the routine "release." This routine follows the same paradigm as previously described routines "reset" and "reserve."

Figure 20:
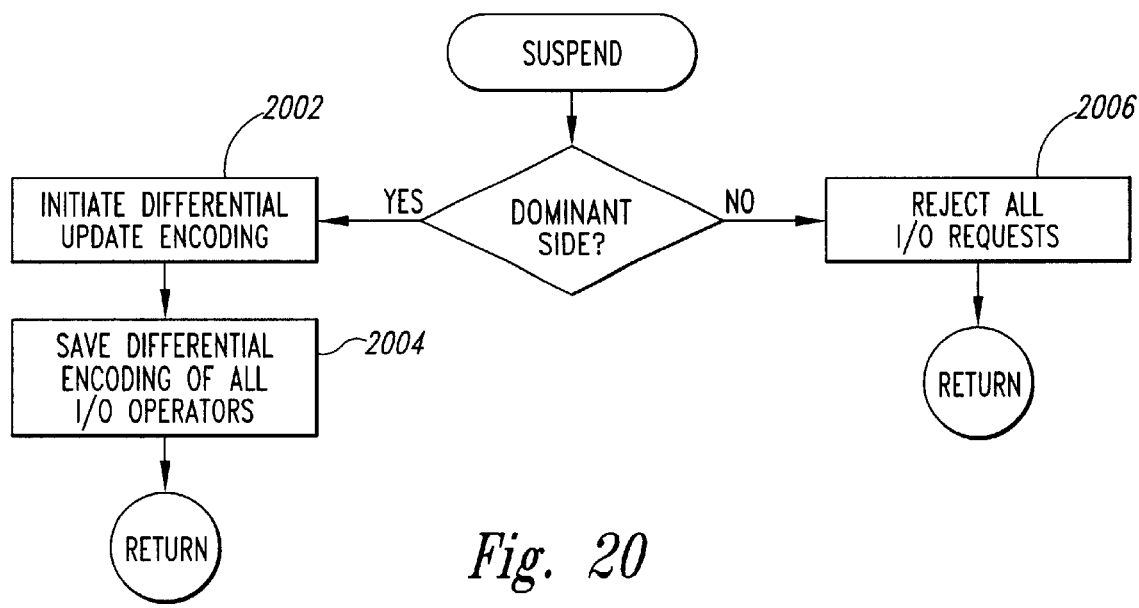
FIG. 20 is a flow-control diagram for the routine "suspend."

FIG. 20 is a flow-control diagram for the routine "suspend." This routine is invoked when certain serious failures occur within the server cluster, like, for example, a serious intercommunications error that prevents communication between the disk arrays containing the dominant and mirror LUNs of the QD. If the suspend command is issued to, or internally generated by, the disk array containing the dominant LUN, then, in step 2002, the controller controlling the disk array containing the dominant LUN initiates differential update encoding for any WRITE requests or other I/O commands that alter the informational content of the dominant LUN. All such update operations are differentially encoded (e.g. as a bit map) into a file or set of files that can be later transferred to the disk array containing the mirror LUN in order to update the data contained in the mirror LUN and in order to bring the mirror LUN back into full correspondence with the dominant LUN. Many different types of differential encoding technologies are currently available. The details of differential encoding are not further discussed. Step 2004 represents continuing differential encoding by the controller controlling the dominant LUN. If, on the other hand, the controller controlling the mirror LUN receives the suspend command, or, if the suspend command is generated within the disk array containing the mirror LUN, the controller continues operating but rejects all subsequent I/O requests from any remote server computer.

Figure 21:
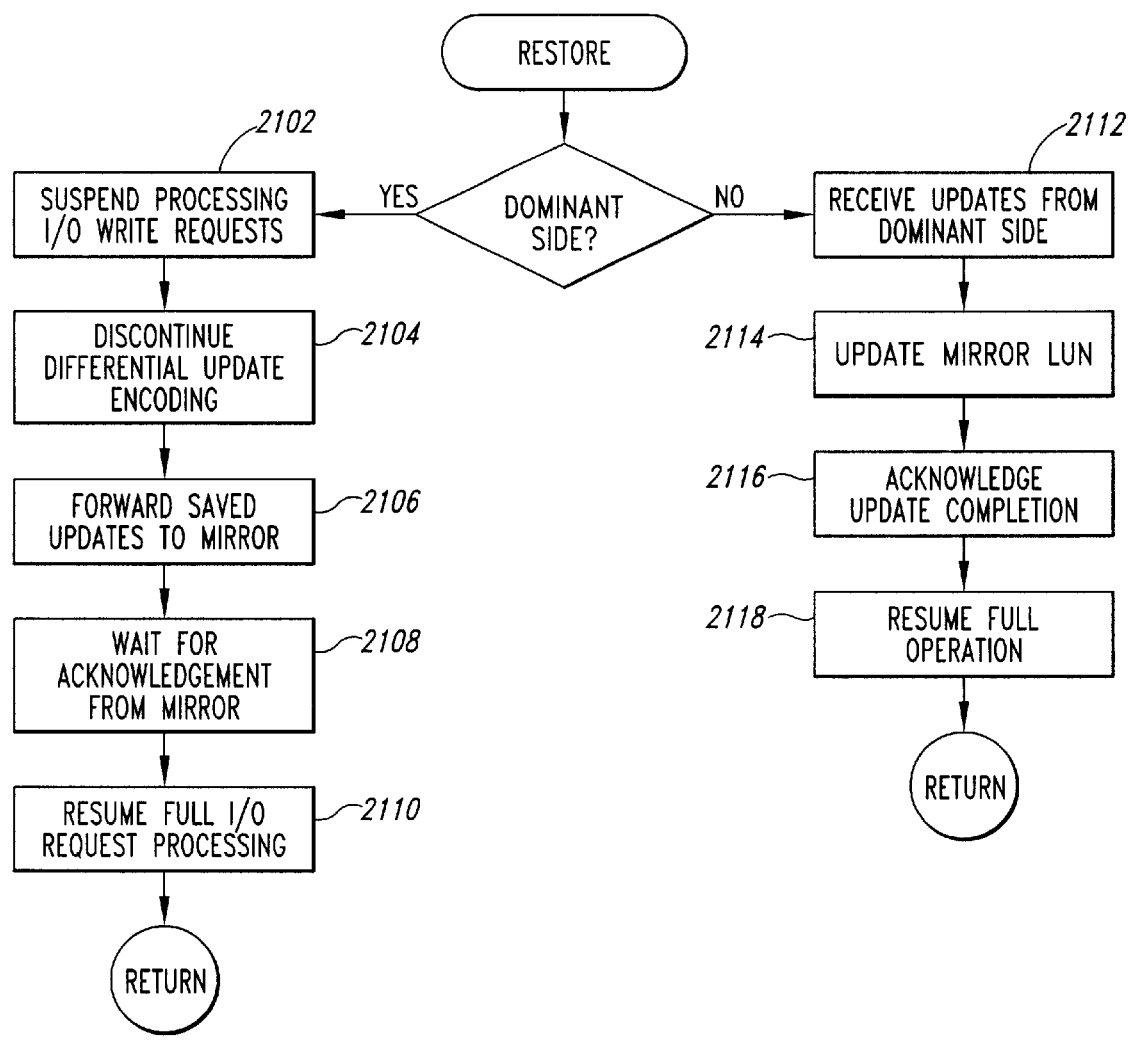
FIG. 21 is a flow-control diagram for the routine "restore."

FIG. 21 is a flow-control diagram for the routine "restore." As with the previously described routine "suspend," operations carried out by the routine "restore" depend on whether the routine is invoked by the controller controlling the dominant LUN of the QD or by the controller controlling the mirror LUN of the QD. In the case of the dominant LUN of the QD, the controller suspends processing all WRITE requests in step 2102 and then, in step 2104, suspends differential update encoding initiated in step 2002 in the routine "suspend." In step 2106, the controller forwards all saved differentially encoded files to the controller controlling the mirror LUN of the QD and waits, in step 2108, for acknowledgement from the mirror. Once acknowledgement is received, then, in step 2110, the controller that controls the dominant LUN of the QD resumes full I/O request processing from the dominant LUN. The controller controlling the mirror LUN of the QD receives the differentially encoded update file or files forwarded to the controller from the controller that controls the dominant LUN of the QD in step 2112. In step 2114, the controller that controls the mirror LUN updates the mirror LUN using the received differentially encoded update files and, in step 2116, acknowledges the receipt of the differentially encoded update files to the controller controlling the dominant LUN. Finally, in step 2118, full I/O processing is resumed by the controller controlling the mirror LUN. Note, however, that the controller controlling the mirror LUN may defer immediate update of the mirror LUN by itself deferring I/O operations until the mirror LUN is updated, and then updating the mirror LUN to reflect all stored I/O operations. This may be necessary when differentially encoded update files require lengthy processing by the controller controlling the mirror LUN that would make the QD unavailable for an extended period of time.

Although the present invention has been described in terms of a particular embodiment, it is not intended that the invention be limited to this embodiment. Modifications within the spirit of the invention will be apparent to those skilled in the art. For example, an almost limitless number of firmware implementations that implement portions of the present invention are possible. Moreover, while most conveniently implemented within disk drives or disk array controllers, a distributed quorum disk may be implemented largely as cooperating and intercommunicating software routines running on a number of servers in a cluster. The discussed embodiment involves combining two disk drives or LUNs into a quorum disk, although distributed quorum disks may comprise more than the disk drives or LUNs in order to further increase reliability and robustness at the expense of more complicated firmware, software, and/or hardware implementations. A server cluster employing a distributed quorum disk can be organized according to an almost limitless number of different architectures and interconnection schemes.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A distributed quorum disk within a server cluster comprising:
    a dominant logical unit, including a unified request queue;
    a mirror logical unit that contains a consistent and current copy of the data stored on the dominant logical unit;
    a first communications medium that interconnects the dominant logical unit and the mirror logical unit;
    a second communications medium that interconnects the dominant logical unit and the mirror logical unit with server computers within the server cluster; and
    control logic that provides, to server computers within the server cluster, an interface to the distributed quorum disk identical to an interface provided by a single-logical-unit quorum disk.

2. The distributed quorum disk of claim 1 wherein the first communications medium is an enterprise server connection.

3. The distributed quorum disk of claim 1 wherein the first communications medium is a SCSI bus.

4. The distributed quorum disk of claim 1 wherein the first communications medium is a fibre channel.

5. The distributed quorum disk of claim 1 wherein the first communications medium and the second communications medium are together part of a single communications medium.

6. The distributed quorum disk of claim 1 wherein the single communications medium of claim 5 is a fibre channel.

7. The distributed quorum disk of claim 1 wherein the dominant logical unit resides in a first disk array and the mirror logical unit resides in a second disk array.

8. The distributed quorum disk of claim 7 wherein the first and second disk arrays are physically separated to provide a geographically dispersed quorum disk.

9. The distributed quorum disk of claim 1 wherein the control logic coordinates I/O request processing and command processing by the dominant logical unit and the mirror logical unit to process received WRITE and READ requests and RESET, RESERVE, RESTORE, SUSPEND, and RELEASE commands identically to processing of WRITE and READ requests and RESET, RESERVE, RESTORE, SUSPEND, and RELEASE commands by single-logical-unit quorum disk.

10. A method for increasing the reliability and availability of a server cluster, the method comprising:
    providing a distributed quorum disk having two interconnected, mirrored logical units;
    substituting the distributed quorum disk for a single-logical-unit quorum disk used to organize server contention and server cluster management;
    providing for operation of the distributed quorum disk within the server cluster to process received WRITE and READ requests and RESET, RESERVE, RESTORE, SUSPEND, and RELEASE commands identically to processing of WRITE and READ requests and RESET, RESERVE, RESTORE, SUSPEND, and RELEASE commands by single-logical-unit quorum disk.

11. The method of claim 10 wherein, when one of the two logical units of the distributed quorum disk fail, continuing processing of received WRITE and READ requests and RESET, RESERVE, RESTORE, SUSPEND, and RELEASE commands identically to processing of WRITE and READ requests and RESET, RESERVE, RESTORE, SUSPEND, and RELEASE commands by single-logical-unit quorum disk.

12. The method of claim 11 wherein, while one of the two logical units of the distributed quorum disk is failed, differentially encoding all updates so that, when the one of the two logical units of the distributed quorum disk that has failed is returned to operation, the differentially encoded updates can be used to update the failed logical unit so that the two logical units of the distributed quorum disk are mirror copies of one another.

13. The method of claim 10 wherein the two logical units of the distributed quorum disk are contained in two different, geographically dispersed disk arrays to provide a geographically dispersed quorum disk.

* * * * *